(12) United States Patent
Liu

(10) Patent No.: US 9,958,001 B2
(45) Date of Patent: May 1, 2018

(54) ELASTIC PRESS-LOCK STRUCTURE

(71) Applicant: Yi-Rong Jam, Taichung (TW)

(72) Inventor: Chao-Lien Liu, Taichung (TW)

(73) Assignee: Yi-Rong Jam, Taichung (TW)

( * ) Notice: Subject to any disclaimer, the term of this patent is extended or adjusted under 35 U.S.C. 154(b) by 209 days.

(21) Appl. No.: 15/098,246

(22) Filed: Apr. 13, 2016

(65) Prior Publication Data

US 2016/0341240 A1    Nov. 24, 2016

(30) Foreign Application Priority Data

May 19, 2015   (TW) .............................. 104115815 A

(51) Int. Cl.
*A44B 19/00* (2006.01)
*F16B 45/02* (2006.01)
*F16B 45/06* (2006.01)

(52) U.S. Cl.
CPC .............. *F16B 45/02* (2013.01); *F16B 45/06* (2013.01)

(58) Field of Classification Search
CPC ...... F16B 45/02; F16B 45/06; Y10T 24/4512; Y10T 24/45204; Y10T 24/45366
See application file for complete search history.

(56) References Cited

U.S. PATENT DOCUMENTS

| | | | | |
|---|---|---|---|---|
| 4,908,913 A * | 3/1990 | Mori | ....................... | F16B 45/02 24/599.4 |
| 9,441,665 B2 * | 9/2016 | Liang | ....................... | F16B 45/02 |
| 9,453,527 B2 * | 9/2016 | Yoo | ....................... | F16L 345/00 |
| 9,630,809 B2 * | 4/2017 | Hoover | ....................... | B66C 1/36 |
| 9,797,432 B2 * | 10/2017 | Inkavesvaanit | ......... | F16B 45/02 |
| 2004/0231116 A1 * | 11/2004 | Goldberg | ............. | A44C 5/2033 24/452 |
| 2013/0219673 A1 * | 8/2013 | Perner | ..................... | F16B 45/02 24/375 |
| 2016/0341239 A1 * | 11/2016 | Inkavesvaanit | ......... | F16B 45/02 |

FOREIGN PATENT DOCUMENTS

KR          200409628 Y1 *  2/2006

* cited by examiner

*Primary Examiner* — Victor D Batson
*Assistant Examiner* — Matthew J Sullivan

(57) ABSTRACT

An elastic press-lock structure has a ring-shaped member and a connection assembly. The ring-shaped member is defined an elongated hole. The connection assembly is passed through the elongated hole of the ring-shaped member and detachably connected with the ring-shaped member. The connection assembly is pressed with a pressing force to deflect toward a first direction with an axle which is a predetermined position of the elongated hole so that the connection assembly is limited by the ring-shaped member which is deformed and the then the connection assembly is reset toward a second direction opposite to the first direction by a restoring force generated by the connection assembly while the pressing force is released.

9 Claims, 11 Drawing Sheets

ELASTIC PRESS-LOCK STRUCTURE

FIELD OF THE INVENTION

The present invention relates to a press lock, and more particularly to an elastic press-lock structure.

BACKGROUND OF THE INVENTION

The known locking hook is mainly used a hook body for hanging a heavy object. In order to prevent the object from being slidably released, a locking body is pivoted at part of the hook body pivotably. In order to make sure the lock body not pivots randomly, a safety switch is designed by some users for controlling the lock body to be pulled in specific conditions.

Please reference to Taiwan publication patent no. TW201414663, it disclosed a locking hook which comprises a hook, a lock and a latch. The lock is movably pivoted to the hook and the lock has a protrusion. The latch sleevedly disposed in a through hole of the hook and has a large diameter part and a small diameter part. By controlling the position of the latch, the protrusion of the lock can pass or not pass through the small diameter part such that when the lock is actuated, the lock is limited and prevented from random pivoting, thereby ensuring the safety of mounting an object on the locking hook or removing the object therefrom. In addition, the hook has a hollow area with one side formed with a grip part which is convenient for a user to hold to exert force to push the latch and prevent his/her hands from being hurt by the hung heavy object.

However, the structure as above mentioned has many elements so that it is hard to assemble and disassemble and the elements may be lost while replacing.

In addition, please reference to Taiwan patent no. TWM486704, it disclosed a safe hook which comprises a main hook, a switch, a latch and a positioning pin. The switch and the end of the catch of each pivoting the main hook, the positioning pins connecting the switch to the lock so that the lock can be open at a position between a closed position and pivot swing. The main hook, the switch and the catch each have an insulating sheath, ensure safety during use of the hook, the hook effectively reduced due to accidentally electrocuted on the human body harm.

The above mentioned structure is assembled by the positioning pin, but it is hard to assembled and disassembled. Also, the operation of reset must exert a force by a user. If the user uses one hand to carry object(s) or one had of the user is not free, it is not easy to open the safe hook to be released. It is inconvenient to use.

The above mentioned ink has the neutral characteristics in the ink itself. It is only used while writing and not used for painting. If the writings or drawings have been written with inks or painted with colors, the above mentioned pen is not capable for be used for waterproof.

In view of the foregoing circumstances, the inventor has invested a lot of time to study the relevant knowledge, compare the pros and cons, research and develop related products. After quite many experiments and tests, the "elastic press-lock structure" of this invention is eventually launched to improve the foregoing shortcomings, to meet the public use.

SUMMARY OF THE INVENTION

An objective of this invention is providing an elastic press-lock structure. It has simplified structure and is easy to assemble and disassemble. Also, it is easy to take to use for a user and replace damaged elements. Furthermore, because the elastic press-lock structure is a hollow structure and made of plastic material or foaming material (also may be made of noctilucent material, fluorescent material, or reflective material), the weight of the elastic press-lock structure is light and durable and the elastic press-lock structure may be floated on water so as to apply to various technical fields and expand more consumer markets.

To achieve above object, an elastic press-lock structure comprises a ring-shaped member, defined an elongated hole; and a connection assembly, passed through the elongated hole of the ring-shaped member and detachably connected with the ring-shaped member; wherein the connection assembly is pressed with a pressing force to deflect toward a first direction with an axle which is a predetermined position of the elongated hole so that the connection assembly is limited by the ring-shaped member which is deformed and the then the connection assembly is reset toward a second direction opposite to the first direction by a restoring force generated by the connection assembly while the pressing force is released.

In some embodiments, the connection assembly at least includes an N-shaped member, an L-shaped member, and a fork member, the fork member has a body portion, a first fork portion, and a second fork portion, the first fork portion and the second fork portion are extended from one end of the body portion axially and outwardly, the first fork portion and the second fork portion are spaced apart from each other, the N-shaped member has a first connection portion, a middle portion, and a first extending portion, the L-shaped member has a second connection portion and a second extending portion, the first connection portion of the N-shaped member is extended from the first fork portion axially and outwardly, the second connection portion of the L-shaped member is extended from the second fork portion axially and outwardly, a length of the first connection portion is longer than a length of the second connection portion, the second extending portion of the L-shaped member is extended radially toward the first connection portion, the middle portion of the N-shaped member is extended radially toward the second connection portion, the first extending portion of the N-shaped member is extended from one end of the middle portion opposite to the first connection portion toward an axial direction of the second connection portion and a direction distant from the second connection portion, one side of the second extending portion adjacent to the second fork portion is abutted against one axial side of the elongated hole of the ring-shape member, and one side of the middle portion distant from the first fork portion is abutted against the other axial side of the elongated hole of the ring-shaped member.

In some embodiments, the connection assembly further includes an abutment member, the abutment member is arranged at one end of the body portion of the fork member distant from the first fork portion and the second fork portion, a handlebar is extended from the ring-shaped member toward the abutment member, a limiting member is formed at the handlebar corresponding to the abutment member, and the limiting member is arranged outside of the abutment member so that the limiting member is limited the abutment member.

In some embodiments, the elongated hole is an oblong hole.

In some embodiments, the elongated hole is an oblong hole, one side of the second extending portion adjacent to the second fork portion is a convex circle surface corresponding to one axial end of the oblong hole, and one side of the middle portion distant from the first fork portion is a convex circle surface corresponding to the other axial end of the oblong hole.

In some embodiments, the connection assembly is made of plastic material or foaming material.

In some embodiments, the connection assembly is a hollow structure.

In some embodiments, each of the ring-shaped member and the connection assembly is a hollow structure and made of plastic material.

In some embodiments, the abutment member is a notch and the limiting member is a hook.

In some embodiments, the ring-shaped member and the connection assembly are made of noctilucent material, fluorescent material, or reflective material.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
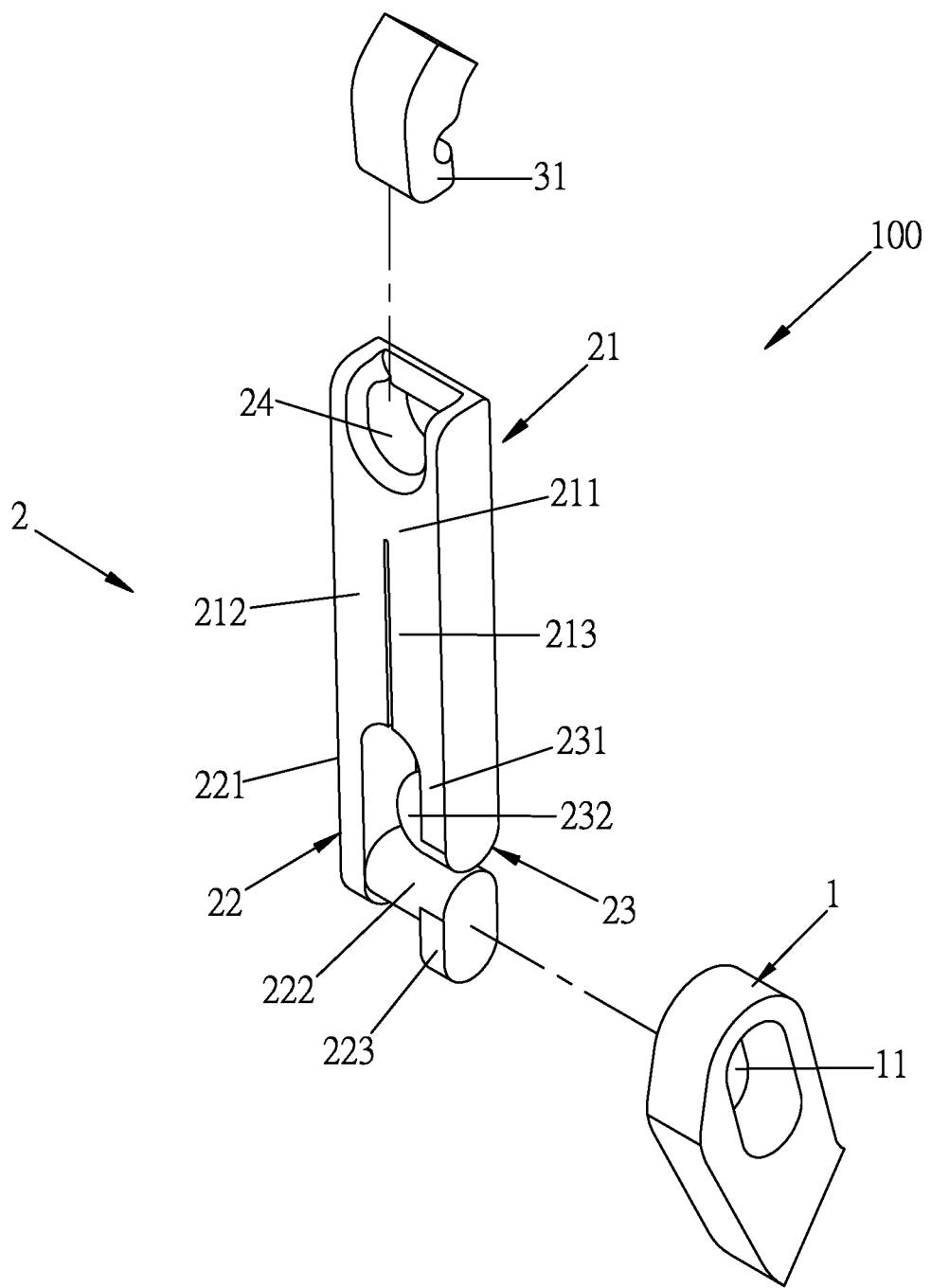
FIG. 1 is an exploded view of an elastic press-lock structure of the present invention.
Figure 2:
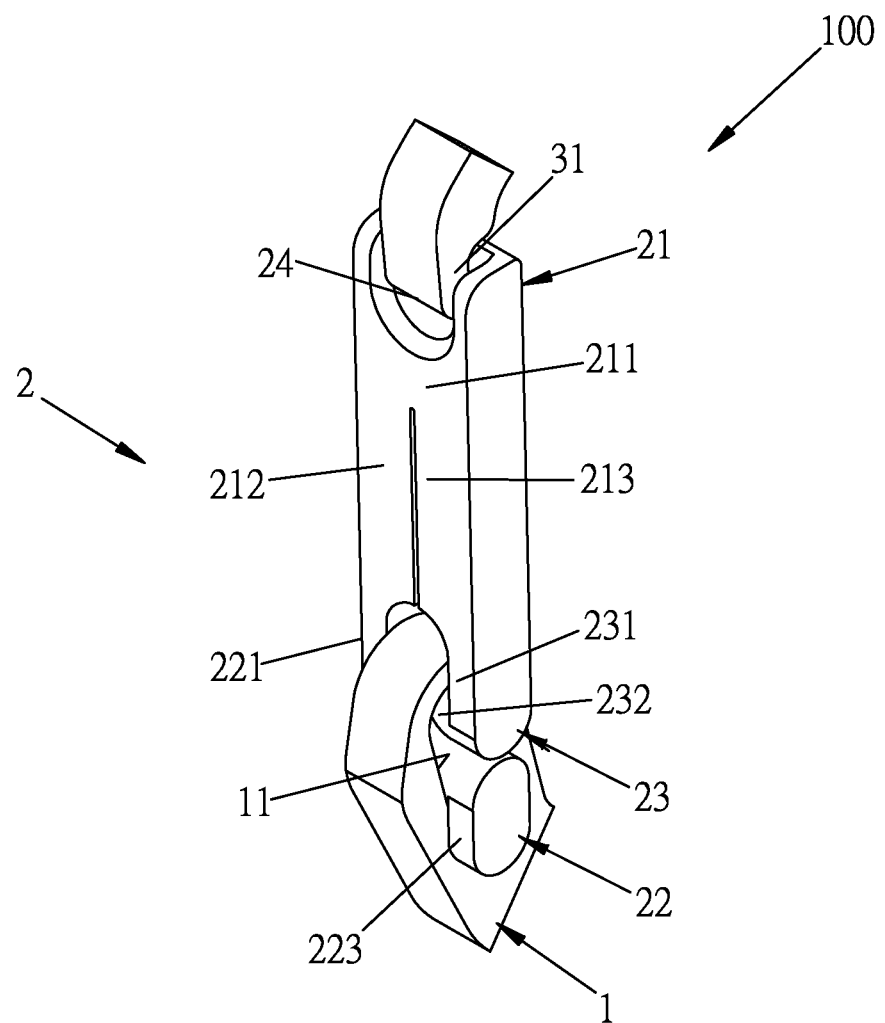
FIG. 2 is a perspective view of the elastic press-lock structure of the present invention.

Referring now to the drawings where like characteristics and features among the various figures are denoted by like reference characters.

Please refer to FIGS. 1 to 5, an elastic press-lock structure 100 of the present invention may comprise a ring-shaped member 1 and a connection assembly 2. The ring-shaped member 1 and the connection assembly 2 may be made of noctilucent material, fluorescent material, or reflective material.

The ring-shaped member 1 may be defined an elongated hole 11. Preferably, the elongated hole 11 may be an oblong hole, shown as in FIG. 1.

The connection assembly 2 may be passed through the elongated hole 11 of the ring-shaped member 1 and detachably connected with the ring-shaped member 1.

Figure 5:
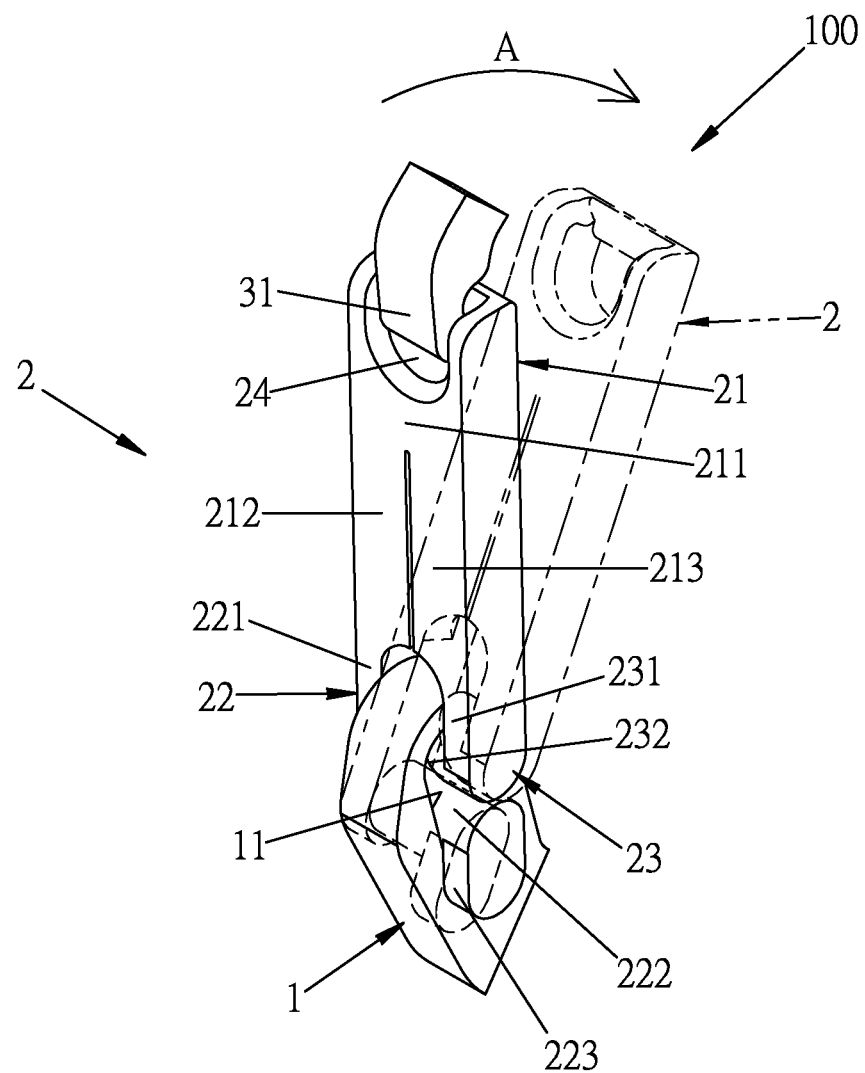
FIG. 5 is a perspective view of the elastic press-lock structure of the present invention while deflecting.

Please refer to FIG. 5, the connection assembly 2 is pressed with a pressing force to deflect toward a first direction (an arrow direction A in FIG. 5) with an axle which is a predetermined position of the elongated hole 11 so that the connection assembly 2 is limited by the ring-shaped member 1 which is deformed and the then the connection assembly 2 is reset toward a second direction opposite to the first direction (the arrow direction A) by a restoring force generated by the connection assembly 2 while the pressing force is released.

The connection assembly 2 at least includes an N-shaped member 22, an L-shaped member 23, and a fork member 21. The fork member 21 has a body portion 211, a first fork portion 212, and a second fork portion 213. The first fork portion 212 and the second fork portion 213 are extended from one end of the body portion 211 axially and outwardly. The first fork portion 212 and the second fork portion 213 are spaced apart from each other. The N-shaped member 22 has a first connection portion 221, a middle portion 222, and a first extending portion 223. The L-shaped member 23 has a second connection portion 231 and a second extending portion 232. The first connection portion 221 of the N-shaped member 22 is extended from the first fork portion 212 axially and outwardly. The second connection portion 231 of the L-shaped member 23 is extended from the second fork portion 213 axially and outwardly. A length of the first connection portion 221 is longer than a length of the second connection portion 231. The second extending portion 232 of the L-shaped member 23 is extended radially toward the first connection portion 221. The middle portion 222 of the N-shaped member 22 is extended radially toward the second connection portion 231. The first extending portion 223 of the N-shaped member 22 is extended from one end of the middle portion 222 opposite to the first connection portion 221 toward an axial direction of the second connection portion 231 and a direction distant from the second connection portion 231. One side of the second extending portion 232 adjacent to the second fork portion 213 is abutted against one axial side of the elongated hole 11 of the ring-shape member 1, and one side of the middle portion 222 distant from the first fork portion 212 is abutted against the other axial side of the elongated hole 11 of the ring-shaped member 1.

Preferably, the elongated hole 11 is an oblong hole. One side of the second extending portion 232 adjacent to the second fork portion 213 is a convex circle surface corresponding to one axial end of the oblong hole, and one side of the middle portion 222 distant from the first fork portion 212 is a convex circle surface corresponding to the other axial end of the oblong hole so that the connection assembly 2 may be deflected smoothly.

In addition, one end of the second extending portion 232 of the L-shaped member 23 corresponding to the second connection portion 231 is a convex circle arc surface.

Besides, the connection assembly 2 further includes an abutment member 24. The abutment member 24 is arranged at one end of the body portion 211 of the fork member 21 distant from the first fork portion 212 and the second fork portion 213. A handlebar 3 (shown as in FIG. 6) is extended from the ring-shaped member 1 toward the abutment member 24. A limiting member 31 is formed at the handlebar 3 corresponding to the abutment member 24 and the limiting member 31 is arranged outside of the abutment member 24 so that the limiting member 31 may be limited the abutment member 24.

Preferably, the abutment member 24 may be a notch and the limiting member 31 may be a hook, but not limited thereto.

Figure 3:
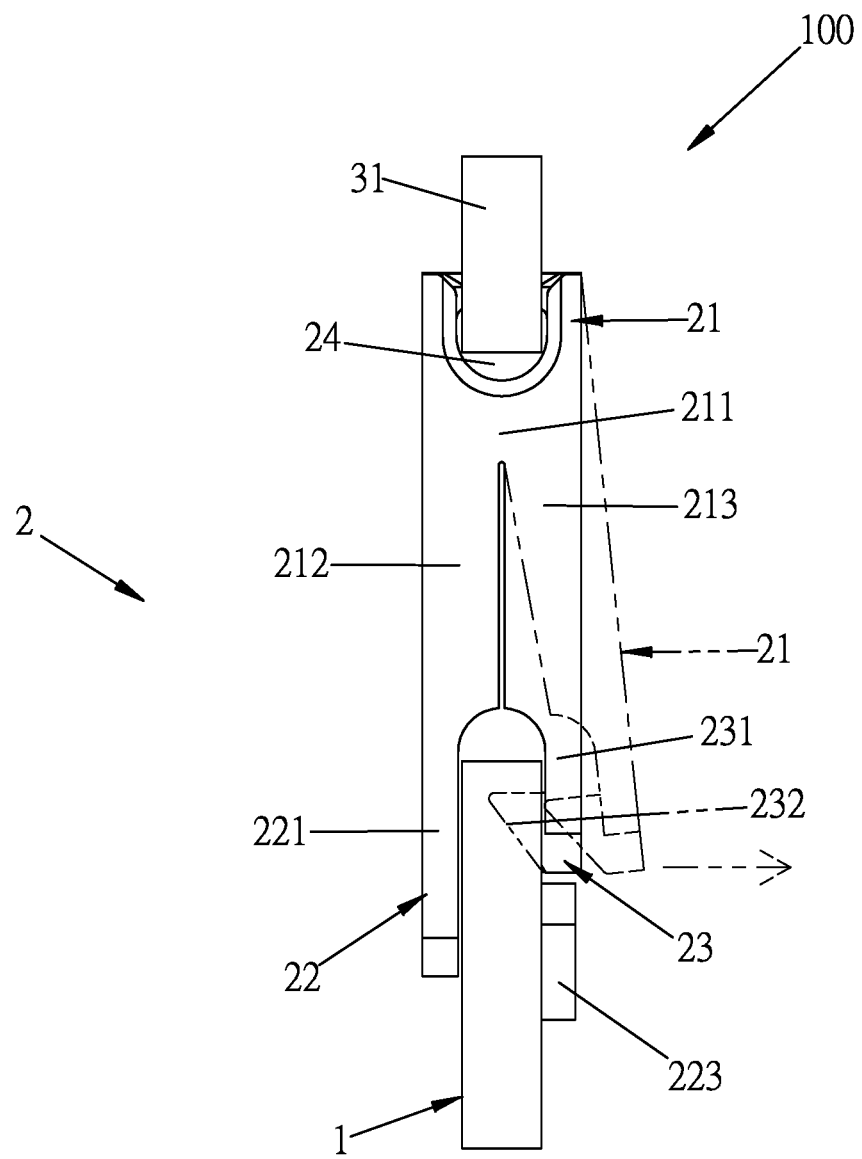
FIGS. 3 and 4 are operation views of the elastic press-lock structure of the present invention while being disassembled.
Figure 4:
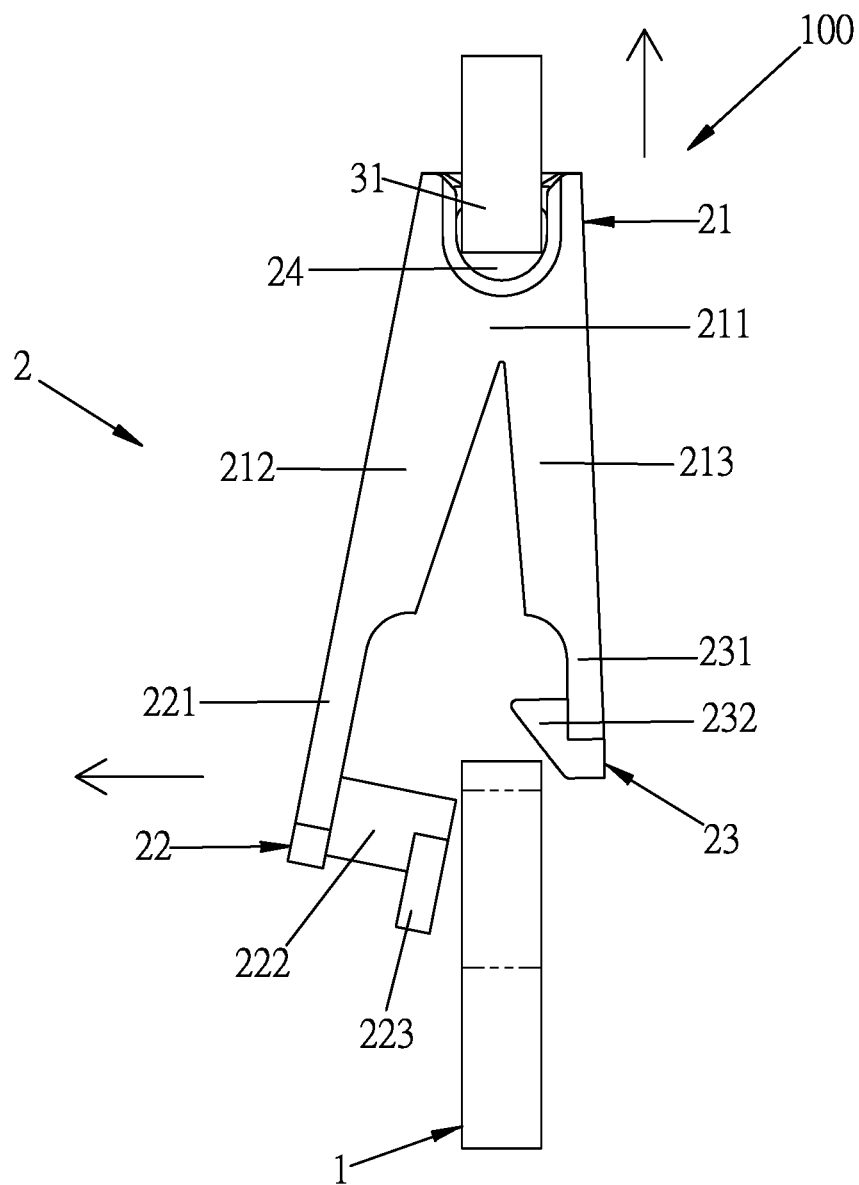

Please refer to FIGS. 3 and 4, when the connection assembly 2 is disassembled from the ring-shaped member 1, the second fork portion 213 may be forced outwardly firstly since the first fork portion 121 and the second fork portion 213 are spaced apart from each other so as to make the L-shaped member 23 leave from the elongated hole 11 of the ring-shaped member 1 and the end with the convex circle arc surface of the second extending portion 232 of the L-shaped member 23 may make the L-shaped member 23 leave from the elongated hole 11 of the ring-shaped member 1 more smoothly. Therefore, the first extending portion 223 of the N-shaped member 22 may be passed through the elongated hole 1 of the ring-shaped member 1 to finish the operation of leaving the connection member 2 from ring-shaped member 1.

In contrast, when the connection assembly 2 is assembled to the ring-shaped member 1, the first extending portion 223 of the N-shaped member 22 may be passed through the elongated hole 11 of the ring-shaped member 1 first and then the first extending portion 223 of the N-shaped member 22 is abutted against one side of the ring-shaped member 1 for limitation to force the second fork portion 213 outwardly. At the same time, the end with convex circle arc surface of the second extending portion 232 of the L-shaped member 23 may be slid through the side of the ring-shaped member 1 to pass through the elongated hole 11 more smoothly. Furthermore, the middle portion 222 of the N-shaped member 22 is abutted against one end of the elongated hole 11, the first extending portion 223 of the N-shaped member 22 is abutted against the side of the ring-shaped member 1, and the second extending portion 232 of the L-shaped member 23 is abutted against the other side of the elongated hole 11 so that the connection assembly 2 may be assembled to the ring-shaped member 1 more smoothly.

Figure 6:
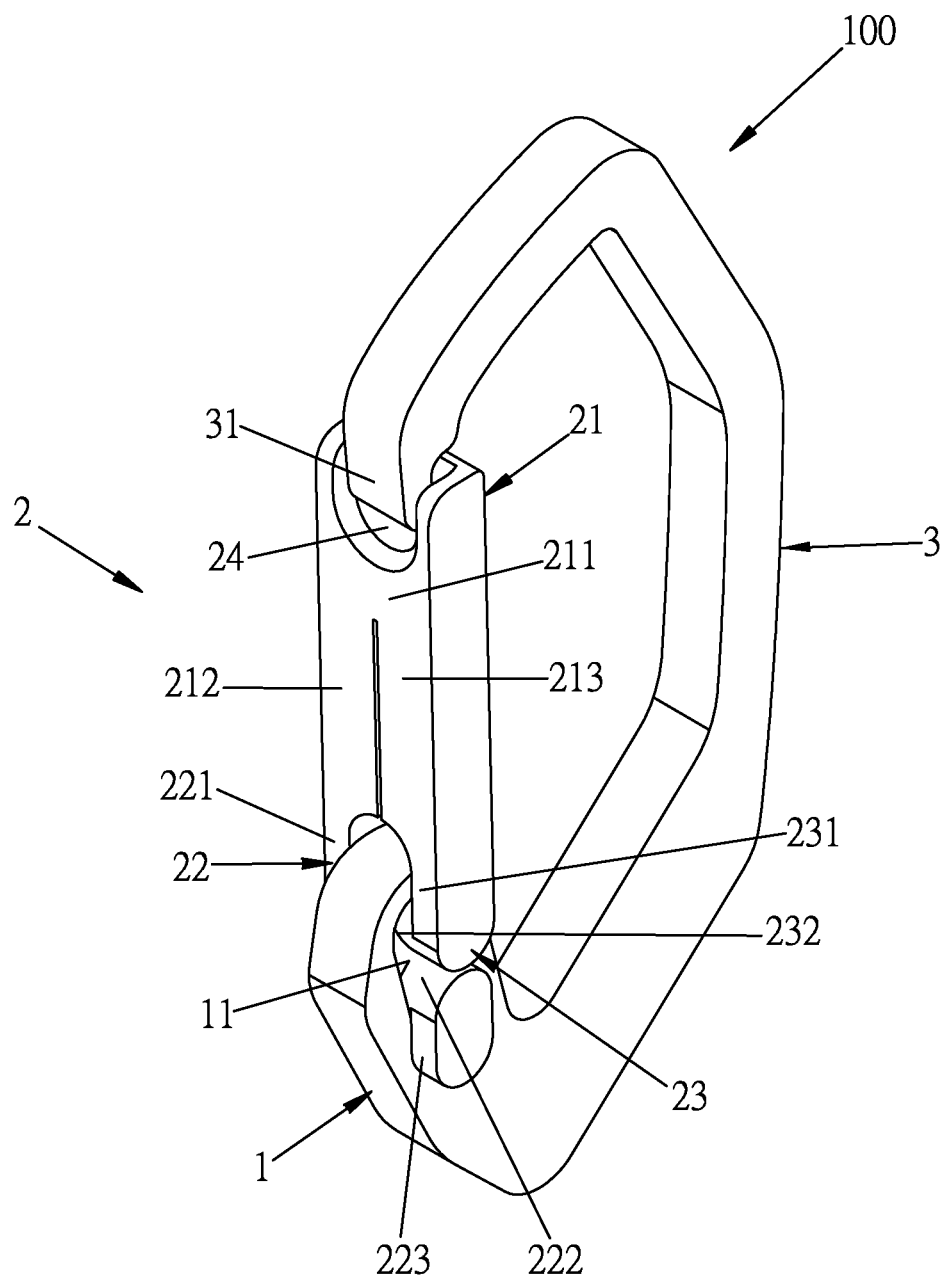
FIG. 6 is a perspective view of a first embodiment of the elastic press-lock structure of the present invention.
Figure 7:
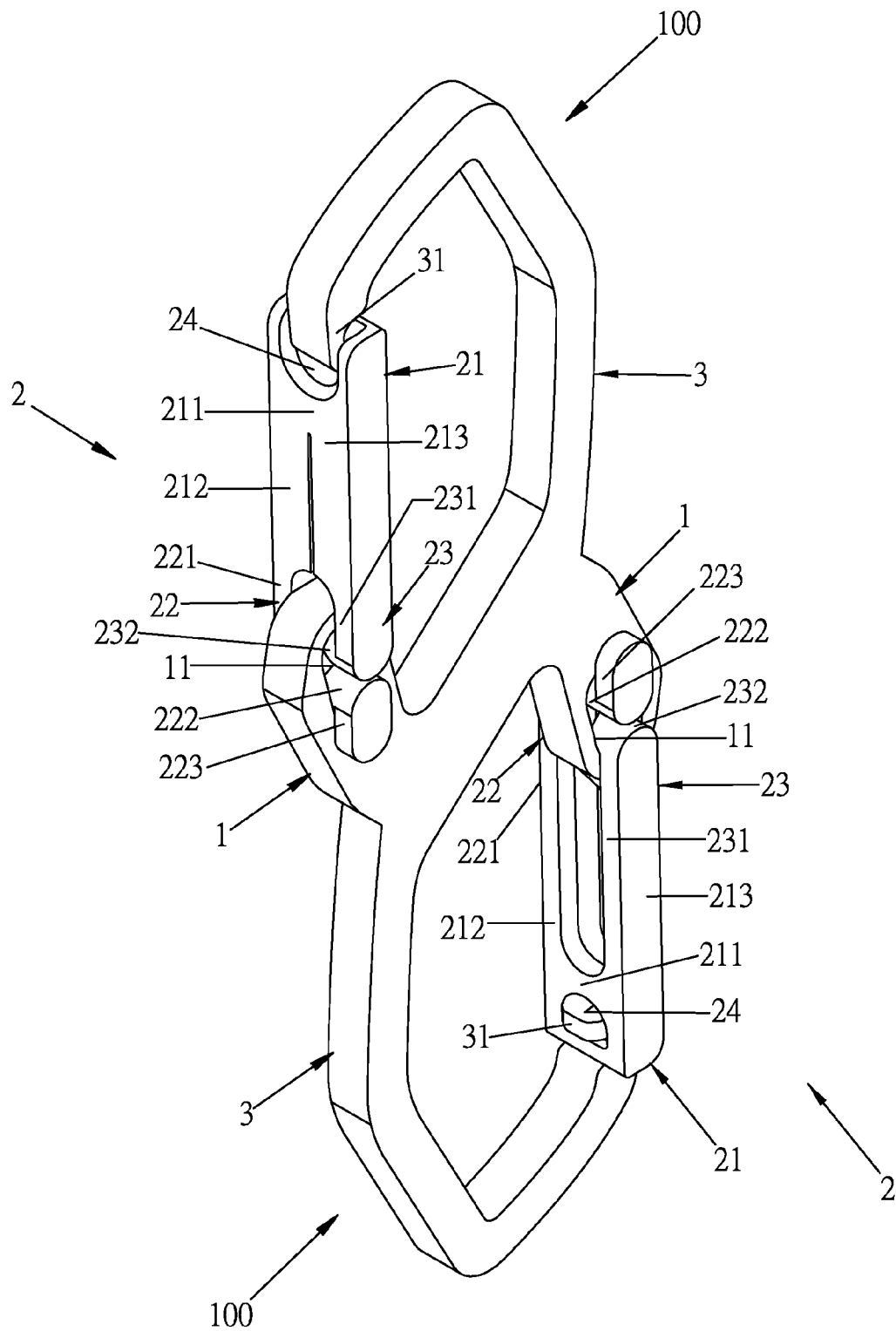
FIG. 7 is a perspective view of a second embodiment of the elastic press-lock structure of the present invention.
Figure 8:
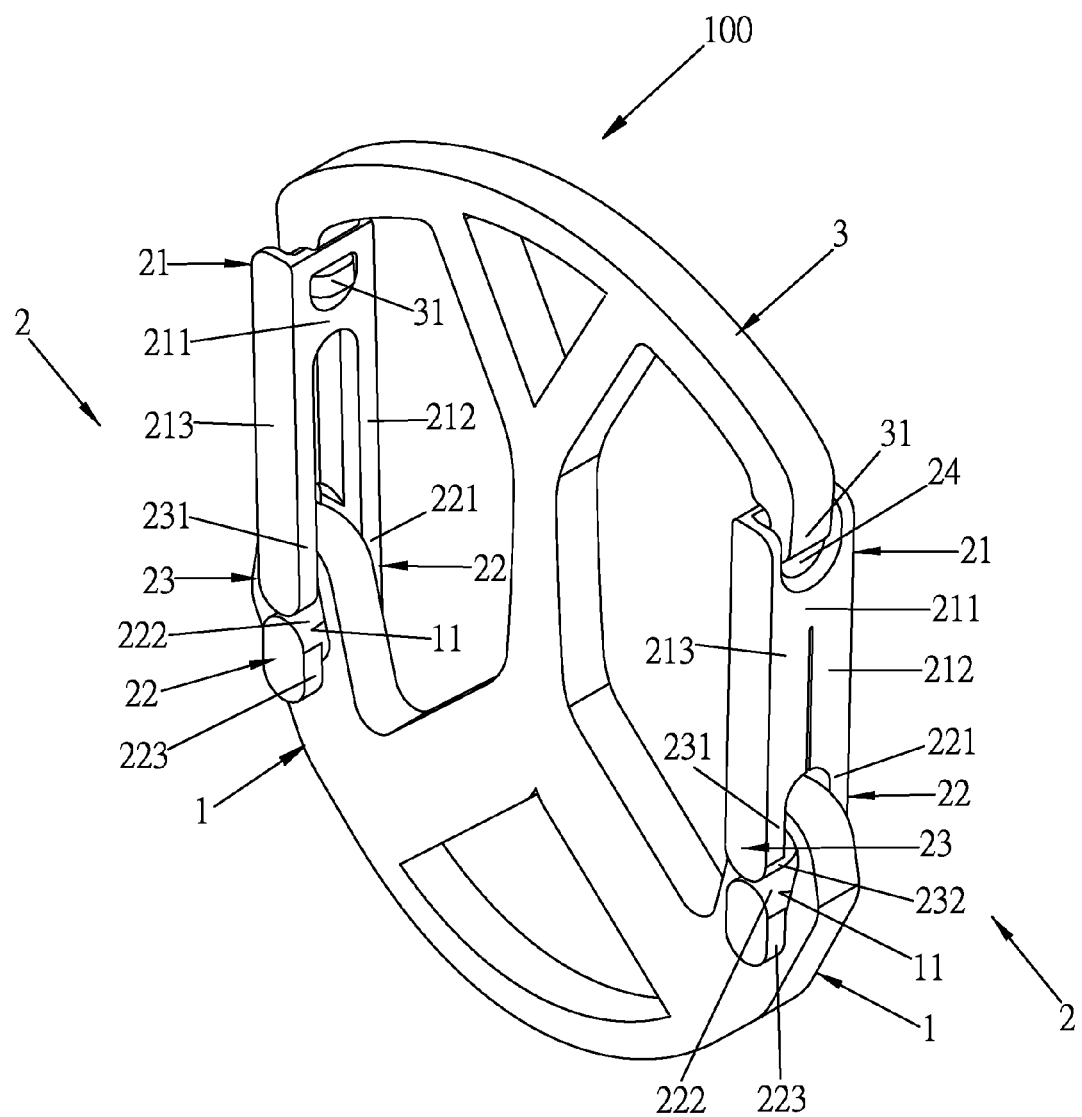
FIG. 8 is a perspective view of a third embodiment of the elastic press-lock structure of the present invention.
Figure 9:
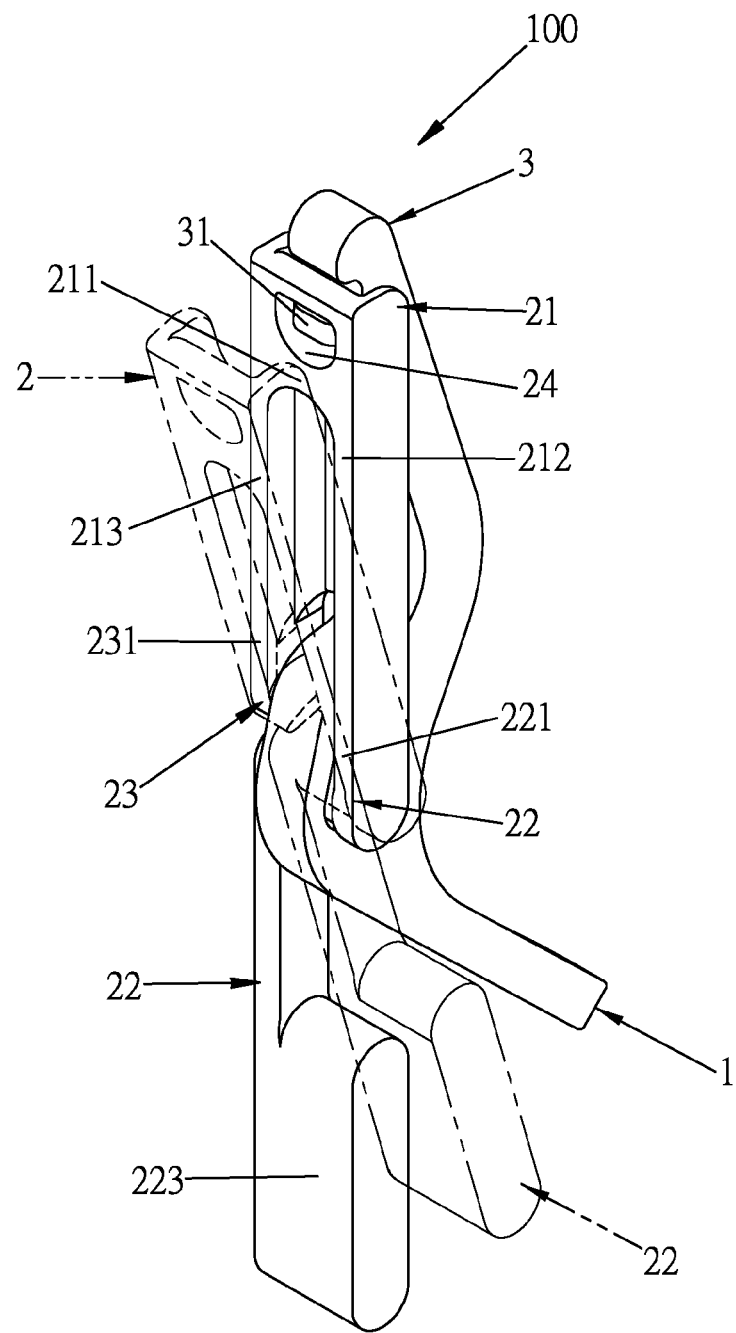
FIG. 9 is a perspective view of a fourth embodiment of the elastic press-lock structure of the present invention.
Figure 10:
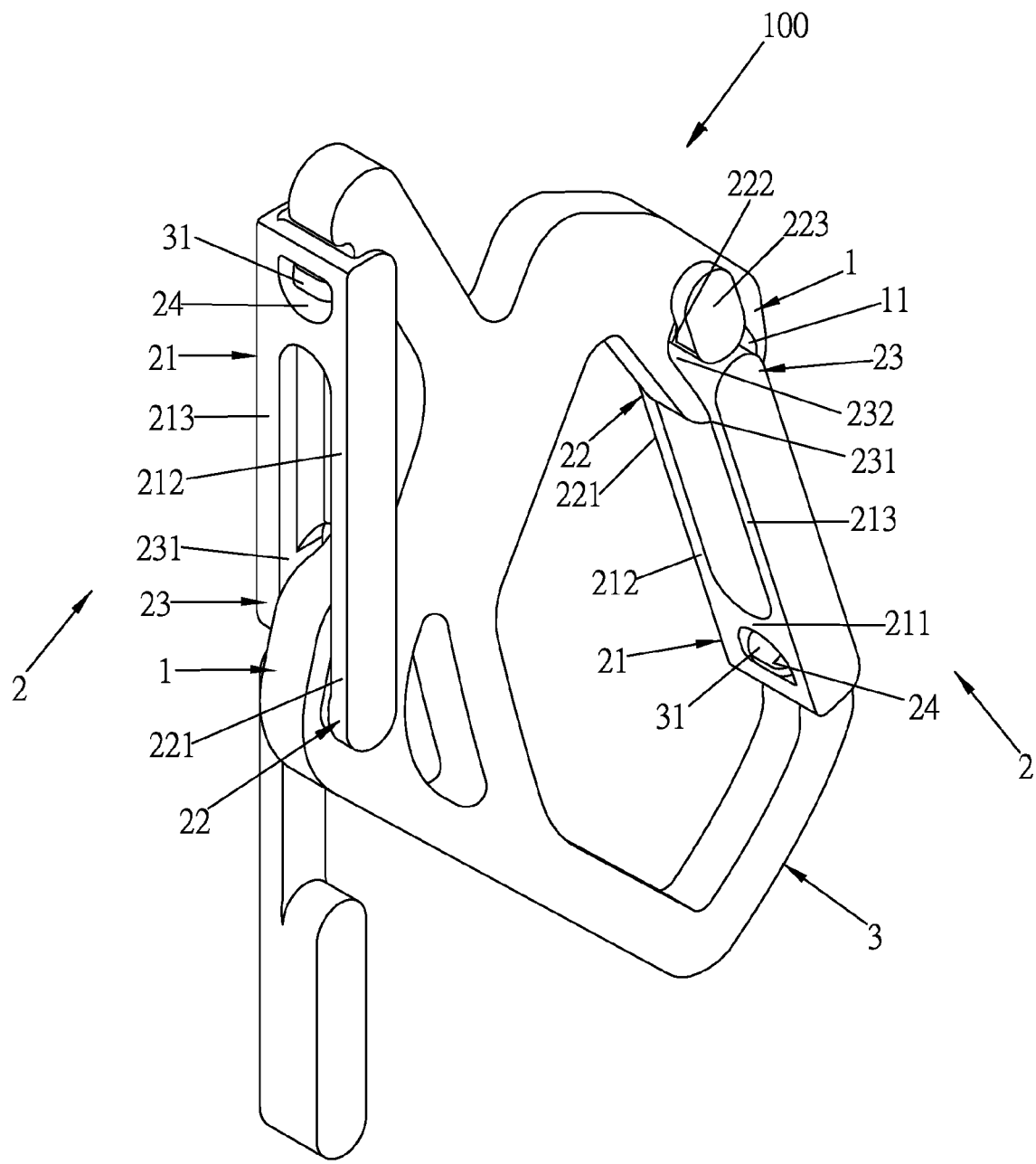
FIG. 10 is a perspective view of a fifth embodiment of the elastic press-lock structure of the present invention.
Figure 11:
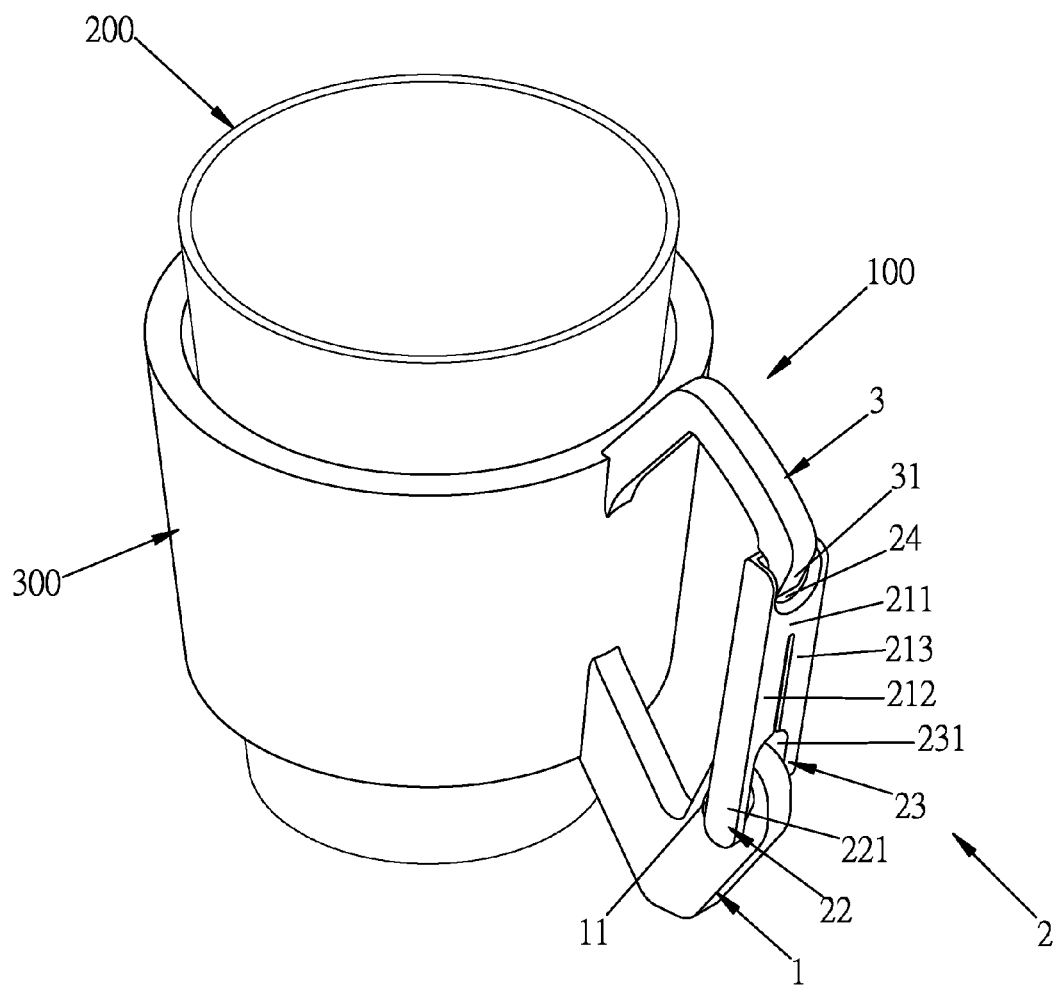
FIG. 11 is a perspective view of a sixth embodiment of the elastic press-lock structure of the present invention.

The elastic press-lock structure 100 of the present invention may be applied to various embodiments, such as the structure of FIG. 7 is combined two structures of FIG. 6 up and down respectively to become one, or the structure of FIG. 8 is combined two structures of FIG. 6 left and right respectively to become one, or a clamp structure of FIG. 9 is modified form the structure of FIG. 6, or the structure of FIG. 10 is modified from the combination of the structures of FIG. 6 and FIG. 9, or the structure of FIG. 11 is formed from the combination of the structure of FIG. 6 and a shrink ring 300 which may be covered with a cup body 200.

The structure of FIG. 11 may be convenient to hang the cup body 200 on a closed bar (not shown). It is not necessary to find a bar with an open end to be hanged. Therefore, it is very convenient and good to save space.

According to above mentioned structure, it has simplified structure and is easy to assemble and disassemble. Also, it is easy to take to use for a user and replace damaged elements. Furthermore, because the elastic press-lock structure 100 is a hollow structure and made of plastic material or foaming material (also may be made of noctilucent material, fluorescent material, or reflective material), the weight of the elastic press-lock structure 100 is light and durable and the elastic press-lock structure 100 may be floated on water so as to apply to various technical fields and expand more consumer markets.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. An elastic press-lock structure, at least comprising:
a ring-shaped member, defining an elongated hole; and
a connection assembly, passed through the elongated hole of the ring-shaped member and detachably connected with the ring-shaped member, the connection assembly at least includes an N-shaped member, an L-shaped member, and a fork member, the fork member has a body portion, a first fork portion, and a second fork portion, the first fork portion and the second fork portion are extended from one end of the body portion axially and outwardly, the first fork portion and the second fork portion are spaced apart from each other, the N-shaped member has a first connection portion, a middle portion, and a first extending portion, the L-shaped member has a second connection portion and a second extending portion, the first connection portion of the N-shaped member is extended from the first fork portion axially and outwardly, the second connection portion of the L-shaped member is extended from the second fork portion axially and outwardly, a length of the first connection portion is longer than a length of the second connection portion, the second extending portion of the L-shaped member is extended radially along the first connection portion, the middle portion of the N-shaped member is extended radially toward the second connection portion, the first extending portion of the N-shaped member is extended from one end of the middle portion opposite to the first connection portion toward an axial direction of the second connection portion and a direction away from the second connection portion, one side of the second extending portion adjacent to the second fork portion is abutted against one axial side of the elongated hole of the ring-shape member, and one side of the middle portion distant from the first fork portion is abutted against the other axial side of the elongated hole of the ring-shaped member;
wherein when the connection assembly is disassembled from the ring-shaped member, the second fork portion is forced outwardly firstly since the first fork portion and the second fork portion are spaced apart from each other so as to make the L-shaped member leave from the elongated hole of the ring-shaped member and one end with a convex circle arc surface of the second extending portion of the L-shaped member makes the L-shaped member leave from the elongated hole of the ring-shaped member, the first extending portion of the N-shaped member is passed through the elongated hole of the ring-shaped member to finish the operation of leaving the connection member from the ring-shaped member; and
wherein when the connection assembly is assembled to the ring-shaped member, the first extending portion of the N-shaped member is passed through the elongated hole of the ring-shaped member first and then the first extending portion of the N-shaped member is abutted against one side of the ring-shaped member for limitation to force the second fork portion outwardly, at the same time, the end with the convex circle arc surface of the second extending portion of the L-shaped member is slid through one side of the ring-shaped member to pass through the elongated hole, the middle portion of the N-shaped member is abutted against one end of the elongated hole, the first extending portion of the N-shaped member is abutted against the side of the ring-shaped member, and the second extending portion of the L-shaped member is abutted against the other side of the elongated hole so that the connection assembly is assembled to the ring-shaped member.

2. The elastic press-lock structure as claimed in claim 1, wherein the connection assembly further includes an abutment member, the abutment member is arranged at one end of the body portion of the fork member distant from the first fork portion and the second fork portion, a handlebar is extended from the ring-shaped member toward the abutment member, a limiting member is formed at the handlebar corresponding to the abutment member, and the limiting member is arranged outside of the abutment member so that the limiting member is limited the abutment member.

3. The elastic press-lock structure as claimed in claim 1, wherein the elongated hole is an oblong hole.

4. The elastic press-lock structure as claimed in claim 1, wherein the elongated hole is an oblong hole, one side of the second extending portion adjacent to the second fork portion is a convex circle surface corresponding to one axial end of the oblong hole, and one side of the middle portion distant from the first fork portion is a convex circle surface corresponding to the other axial end of the oblong hole.

5. The elastic press-lock structure as claimed in claim 1, wherein the connection assembly is made of plastic material or foaming material.

6. The elastic press-lock structure as claimed in claim 1, wherein the connection assembly is a hollow structure.

7. The elastic press-lock structure as claimed in claim 1, wherein each of the ring-shaped member and the connection assembly is a hollow structure and made of plastic material.

8. The elastic press-lock structure as claimed in claim 2, wherein the abutment member is a notch and the limiting member is a hook.

9. The elastic press-lock structure as claimed in claim 1, wherein the ring-shaped member and the connection assembly are made of noctilucent material, fluorescent material, or reflective material.

* * * * *